A. G. & M. ANDALAFT.
CONE WAFFLE MACHINE.
APPLICATION FILED MAY 18, 1908.
943,293.
Patented Dec. 14, 1909.
2 SHEETS—SHEET 1.
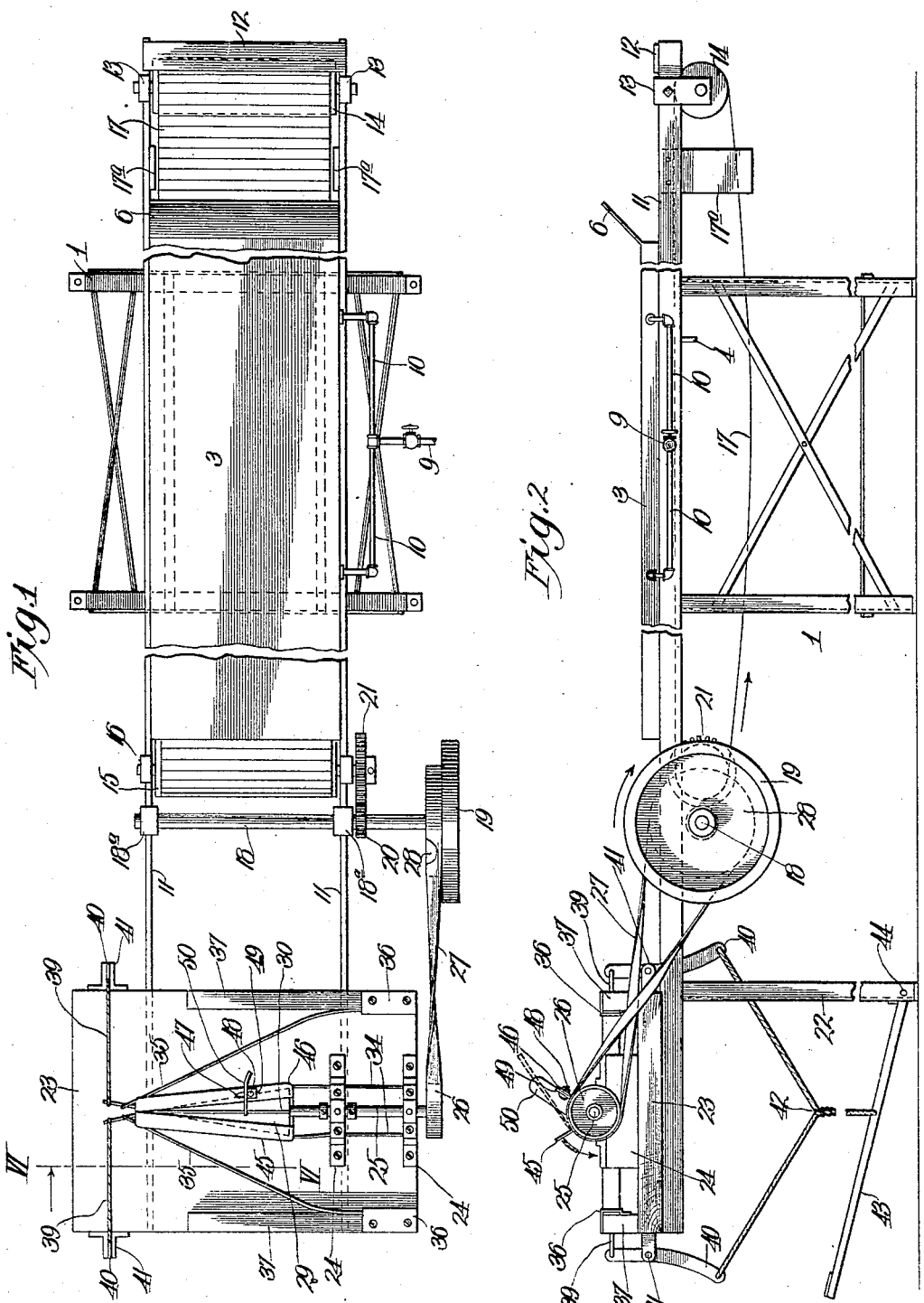
Witnesses.
E. E. Seidelman.
H. C. Rodgers.
Inventors.
A. G. Andalaft and M. Andalaft
By George J. Thorpe
Atty.

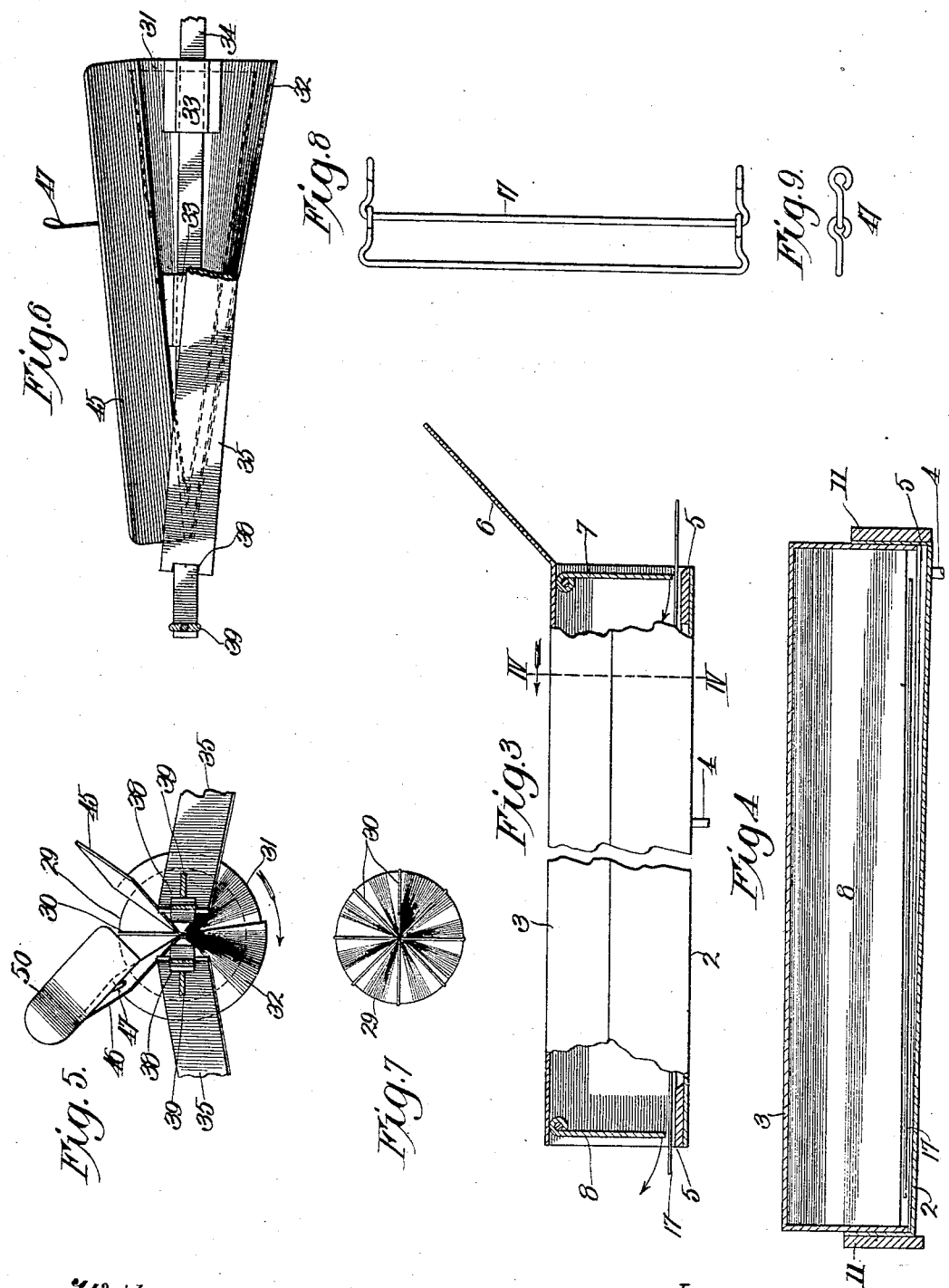

UNITED STATES PATENT OFFICE.

ALEXANDER G. ANDALAFT AND MICHEL ANDALAFT, OF KANSAS CITY, MISSOURI.

CONE-WAFFLE MACHINE.

943,293.  Specification of Letters Patent.  Patented Dec. 14, 1909.

Application filed May 18, 1908. Serial No. 433,535.

*To all whom it may concern:*

Be it known that we, ALEXANDER G. ANDALAFT and MICHEL ANDALAFT, respectively a citizen of the United States and a subject of the Sultan of Turkey, residing at Kansas City, in the county of Jackson and State of Missouri, have invented certain new and useful Improvements in Cone-Waffle Machines, of which the following is a specification.

Our invention relates to cone-waffle machines, and more especially to machines through which flat brittle waffles are passed to be first softened or rendered flexible and then rolled or coiled into hollow cones closed at one end and open at the other, to provide receptacles for ice cream or other filling, our object being to produce a machine of this character by which flat waffles can be softened and transformed into cones efficiently and expeditiously.

With this general object in view and others as hereinafter appear, the invention consists in certain novel and peculiar features of construction and organization as hereinafter described and claimed; and in order that it may be fully understood reference is to be had to the accompanying drawings, in which—

Figure 1, is a plan view of a machine embodying our invention. Fig. 2, is a side view of the same. Fig. 3, is an enlarged broken view partly in side elevation and partly in central longitudinal section of the chamber in which the flat waffles are softened. Fig. 4, is a cross section on the line IV—IV of Fig. 3. Fig. 5, is an enlarged view of the apex end of the cone-forming mechanism. Fig. 6, is a section on the line VI—VI of Fig. 1 on the same scale as Fig. 5. Fig. 7, is a view of the apex end of the rotary cone or roller of the cone-forming mechanism. Fig. 8, is a plan view of part of the endless conveyer forming part of the machine. Fig. 9, is a side view of the same.

In the said drawings where like reference characters indicate corresponding parts, 1 is a skeleton supporting frame for the steam chamber consisting by preference of a pair of sheet metal troughs inverted with respect to each other and numbered 2 and 3 respectively, the trough 2 forming the bottom and trough 3 the top of the chamber. The bottom at a suitable point is preferably pitched downwardly and rearwardly as shown in Fig. 4 and at the lower end of said pitched portion is a drain pipe 4 through which condensed steam is drained from the chamber.

5 is a pair of cross bars secured upon the bottom of trough 2 at its ends.

6 is a guide wing extending upwardly and forwardly from the top of the receiving or front end of the chamber constituted by said troughs and 7 and 8 are gates pivotally pendent within the chamber at its receiving and discharge ends respectively, the lower edges of said gates terminating a short distance above cross strips 5.

9 is a valve-controlled steam supply pipe provided with branch pipes 10, projecting into the casing for the purpose of supplying the same with steam at different points along its length.

11 is a pair of bars secured to the side walls of the chamber and connected at their front ends by cross bar 12, and provided at such ends with depending bearings 13 for the transverse roller 14, a similar roller 15 at the opposite end of the chamber having its shaft journaled in similar bearings 16 carried by said bars 11, said rollers being connected by an endless skeleton conveyer 17 of the type shown in Figs. 8 and 9. The upper strand of said conveyer extends longitudinally through the said chamber between the cross strips 5 and the lower edges of gates 7 and 8 and its weight is such that its lower part sags as shown in Fig. 2 and holds' its upper part substantially horizontal. The frictional action of the chain with the rollers, which are preferably smooth wood rollers, is sufficient to insure continuous traveling movement of the conveyer, the latter being prevented from creeping laterally by a pair of guard plates 17$^a$ depending from bars 11 at opposite sides of the conveyer.

18 is a transverse shaft arranged rearward of and contiguous to roller 15 and journaled in bearings 18$^a$ depending from bars 11, a pulley 19 mounted on one end of shaft 18 being driven in the direction indicated by the contiguous arrow Fig. 2, by a belt not shown, and said shaft is equipped with a gear-pinion 20 meshing with a gear wheel 21 secured on the shaft of roller 15 to compel the conveyer to travel in the direction indicated by the contiguous arrow, Fig. 2.

22 is a leg-frame or equivalent support for bars 11 rearward of shaft 18 and secured in any suitable manner upon said bars is a table 23 equipped with a pair of bearings 24 for a transverse shaft 25 having a belt pulley 26, at one end connected by a cross belt 27 with belt pulley 28, on shaft 18. At its opposite end shaft 25 is equipped with a conical roller 29 having longitudinally extending ribs 30.

31 and 32 are cone-segment clamping-guides arranged around and slightly spaced from cone 29 and completely enveloping the same to and beyond its apex, but exposing the upper part of the same for a greater portion of its length to provide for the insertion of a flat flexible waffle as hereinafter explained, it being noted by reference to Figs. 5 and 6 particularly that the guide 32 underlaps guide 31 in order to offer no obstruction to the free movement of the waffle as hereinafter explained, in the direction indicated by the contiguous arrows Figs. 2 and 5.

33 are keepers secured upon the outer sides of guides 31 and 32 and engaging the same are supporting bars 34 capable of swinging movement toward and from each other, said bars being preferably resilient and secured in position by the bearings 24 of shaft 25.

35 are springs at opposite sides of bars 34 and secured between brackets 36 and upwardly projecting walls 37 of the table. Said springs 35 converging forwardly and engage the contiguous bars 34 forward of the conical roller and guides to hold the latter clamped toward the former, the front ends of said springs having notches 38 through which the guide-carrying swing bars 34 extend.

39 indicate cords or chains attached respectively at their opposite ends to the free ends of the guide-carrying bars 34 and the upper ends of a pair of levers 40 fulcrumed in supporting brackets 41 carried by table 23, the branches of the cable 42 connecting the lower ends of said levers with a foot lever or treadle 43 pivoted as at 44 to the supporting leg frame 22, the arrangement being such that downward movement of the foot lever or treadle through the connections described overcomes the resistance of springs 35 and swings the cone-guides apart to permit a cone-waffle formed around roller 29 as hereinafter explained, to be slipped off the apex end of said roller.

To provide a hand rest for the operator, who will sit or stand at the rear end of the machine, the guides are provided respectively with upwardly diverging flanges 45 and 46, the latter having a longitudinal slot 47, engaged by a bolt 48, extending therethrough and through the ear 49 of the gage plate 50, this gage plate being disposed a distance from the apex end of the cone roller slightly exceeding the diameter of the waffle to be rolled into conical form.

Heretofore cone waffles, have, of necessity, been made by hand, because it was necessary to roll them immediately upon removal from the baking irons, as within a few seconds after their removal they become so brittle that they cannot be rolled without breakage. This method of making the waffles is unsatisfactory also because a great many of such waffles are imperfect, that is, are not completely closed at their apex ends and hence permit the ice cream placed therein, when melted, to drip from such end. It is furthermore objectionable because severe on the operator's hands in that his hands are burned frequently from contact with the baking irons, especially where the operator is in charge of several baking irons and must handle the waffles with great rapidity.

Where our machine is employed, the waffles can be stored until ready to be rolled, of course becoming brittle immediately after they are removed from the baking irons and in such brittle condition are successively fed by the operator onto the conveyer at the receiving end of the machine, being tossed lightly thereon, the wing 6, insuring the deposit on the conveyer of any waffle which otherwise might fall upon the chamber instead of upon the chain at the front end of the said chamber. The chain is moving constantly in the direction hereinbefore mentioned and the waffles which are roughened in the making, offer sufficient frictional resistance to swing the gate 7 inwardly, such gate of course closing after the entrance of each waffle into the chamber so as to prevent the escape of any material volume of steam from the casing. As the waffles pass through the latter they are thoroughly softened as the steam has access to them from below as well as above the conveyer. As they successively emerge from the rear end of the steam chamber, they swing gate 8 out of their path as indicated by the arrow, Fig. 3, and are grasped by the operator stationed near table 23 and fed in substantially the position shown by dotted lines Fig. 2 down between the ribbed conical roller and guide 31, the latter holding the waffle with sufficient pressure against the cone to compel the latter to carry the waffle around with it and coil it to conical form, the apex end of the cone being completely closed by reason of the fact that the guides project a substantial distance beyond the apex of the roller, it being understood that the waffles are disposed against gage plate 50 in order that the cone-waffles shall be of substantially uniform length. As each cone is completed, the operator stationed near table 23 depresses the foot lever or treadle to swing the guides 31 and 32 apart as hereinbefore explained to permit the cone-waffle to be removed endwise from the cone and deposited in a suitable support such as a perforated board, not shown, the cone-waffles being sufficiently hardened by the time they are removed from the roller to retain their conical shape.

From the above description it will be apparent that we have produced a cone-waffle machine possessing the features of advantage enumerated as desirable and we wish it to be understood that we reserve the right to make all changes properly falling within the spirit and scope of the appended claims.

Having thus described the invention what we claim as new and desire to secure by Letters-Patent is:—

1. A cone-waffle machine, comprising a steam chamber, means for conveying waffles therethrough to soften them, a rotating rough-faced roller, guides partly surrounding and inclosing the same, and means for moving said guides apart to permit the cone-waffle thus formed to be removed from the roller.

2. A cone-waffle machine, comprising a steam chamber, means for conveying waffles therethrough to soften them, a rotating rough-faced roller, guides partly surrounding and inclosing the same, and means holding the guides pressed yieldingly toward the roller.

3. A cone-waffle machine, comprising a steam chamber, means for conveying waffles therethrough to soften them, a rotating rough-faced roller, guides partly surrounding and inclosing the same, means holding the guides pressed yieldingly toward the roller, and lever-controlled means for separating said guides from the roller and each other.

4. A cone-waffle machine, comprising a steam chamber, means for conveying waffles therethrough to soften them, a rotating rough-faced roller, guides partly surrounding and inclosing the same, and a gage-plate adjustable lengthwise of said guides to determine the position of the waffle as it is fed between the roller and under the said guides.

5. In a machine of the character described, a shaft suitably journaled provided at one end with a conical roller, a pair of guides at opposite sides of and underlying said roller and projecting beyond the apex of the same, and means holding said guides pressed yieldingly together.

In testimony whereof we affix our signatures, in the presence of two witnesses.

ALEXANDER G. ANDALAFT.
MICHEL ANDALAFT.

Witnesses:
G. W. DUVALL,
G. Y. THORPE.